UNITED STATES PATENT OFFICE.

JOHN B. JONES, OF BROOKLYN, N. Y., ASSIGNOR, BY MESNE ASSIGNMENTS, TO THE KALAMEIN ALLOY COMPANY, (LIMITED,) OF PITTSBURG, PA.

ALLOY FOR COATING METALS.

SPECIFICATION forming part of Reissued Letters Patent No. 10,415, dated December 4, 1883.

Original No. 234,482, dated November 16, 1880. Application for reissue filed November 12, 1883. Patented in France April 22, 1880, No. 136,275; in Belgium April 23, 1880, No. 51,251; in Germany May 5, 1880, No. 11,801, and in England September 15, 1880, No. 3,754.

*To all whom it may concern:*

Be it known that I, JOHN B. JONES, of Brooklyn, in the county of Kings and State of New York, have invented a new and Improved Alloy for Coating Metals, of which the following specification is a description.

My invention consists in a compound metal or alloy composed of nickel, lead, tin, and zinc, compounded for use as a metal bath, into which iron sheets or other metal articles are to be immersed, and thereby coated, so as to prevent oxidation.

I am aware that attempts have been made to combine lead, tin, and zinc as an alloy to form a coating for iron, but with comparatively small success, for the reason that lead, tin, and zinc, without the addition of something to make the union stable, will not form an intimate and permanent alloy. By my invention I am enabled to accomplish this desired union of the lead, tin, and zinc by the addition of a small quantity of nickel, as hereinafter set forth.

I will now proceed to describe the mode which I prefer to employ in compounding my alloy.

The proportions of the lead, tin, and zinc may be varied considerably from that hereinafter stated, according to the purpose designed to be accomplished by the coating; but the nickel should not materially exceed the proportion hereinafter set forth. I first melt, in a large crucible, from three to six ounces of nickel. Into this crucible I pour from three to six pounds of melted lead, and mix the two metals thoroughly. This melted mixture is then poured into a melting-pot containing from ninety-four to ninety-eight pounds of melted lead. Into this pot of nickel and lead I put about fifty to seventy-five pounds of zinc and mix thoroughly. Into this mixture I then melt and thoroughly mix about twenty-nine pounds of tin. This alloy thus made may be cast into ingots, and be remelted, as desired; or it may be at once poured into the metal tank or kettle, into which the articles to be coated are immersed in the usual manner until the desired coating is obtained. After the nickel and lead are melted together it is better to introduce the zinc and then the tin in ingots near the bottom of the melted metal by dropping the pieces through a cylinder having its upper end above the edge of the pot and its lower end near the bottom of the pot. This mode of introducing the zinc and tin facilitates a more thorough mixture.

In coating metals by this invention, I prefer to first subject them to the action of the acid and neutralizing baths for cleaning the metal and decomposing the injurious ferric salts, fully described in Letters Patent No. 234,341, granted to me November 16, 1880.

One of the important results which I am enabled to accomplish by the addition of a small percentage of nickel to the combination of zinc, tin, and lead is that I can thereby use as a coating a larger percentage of lead without danger of the separation of the component metals, while the alloy, as compounded, is as electro-positive to iron, or nearly so, as zinc alone.

Metal coated by this alloy is as well or better protected against oxidation, and its durability and tenacity are not injured to anything like the same extent as when coated with zinc alone, and the coating itself is more flexible. The metal bath of this alloy may be used at a temperature of 100° Fahrenheit lower than when zinc only is used as a coating. Besides this, when zinc only is used, the hot melted zinc acts upon the iron in such a way as to dissolve from the iron a quantity of its surface, which, combining with a portion of the zinc, becomes a heavy infusible dross, chiefly consisting of iron and zinc, which falls to the bottom of the metal bath, and interferes with the proper action of the same. This dross requires to be removed, as it is a source of great waste, and it is difficult to dispose of it at even less than half the original cost of the materials which compose it.

My improved alloy has a greater fluidity than zinc only, and with it an effective coating can be made with a smaller percentage of metal than with zinc, so that less weight is imparted to articles coated by it.

Metals coated with this alloy will stand long-continued exposure, even in an unfavorable climate, without any apparent oxidation, as I have frequently demonstrated by practical experiments.

What I claim as my invention, and desire to secure by Letters Patent, is—

The alloy of nickel, lead, tin, and zinc, compounded substantially as herein set forth, and for the purpose described.

JOHN B. JONES.

Witnesses:
ERNEST C. WEBB,
ARTHUR C. WEBB.